United States Patent [19]

Bellows

[11] Patent Number: 4,951,234

[45] Date of Patent: Aug. 21, 1990

[54] MONITORING A PLURALITY OF IDENTICAL PROCESS PARAMETERS

[75] Inventor: James C. Bellows, Maitland, Fla.

[73] Assignee: Westinghouse Electric Corp., Pittsburgh, Pa.

[21] Appl. No.: 209,818

[22] Filed: Jun. 22, 1988

[51] Int. Cl.[5] .............................................. G01F 15/06
[52] U.S. Cl. .................................... 364/550; 364/138;
340/825.06; 340/825.11
[58] Field of Search ................... 364/550, 551.01, 138;
340/825.06, 825.11

[56] References Cited

U.S. PATENT DOCUMENTS

| 4,644,479 | 2/1987 | Kemper et al. | 364/550 |
| 4,718,025 | 1/1988 | Minor et al. | 364/550 |
| 4,720,806 | 1/1988 | Schippers et al. | 364/551.01 |
| 4,802,094 | 1/1989 | Nakamura et al. | 364/550 |

*Primary Examiner*—Parshotam S. Lall
*Assistant Examiner*—Brian M. Mattson

[57] ABSTRACT

A method and apparatus for monitoring a plurality of processes which are identical with respect to at least one process parameter, employing a plurality of sensors each disposed for monitoring the one process parameter of a respective process, the sensors all having identical responses to the one process parameter. Monitoring is performed by: deriving (2-10) from the sensor responses a succession of response samples each derived from a respective sensor. Then each sample is monitored in succession and a predetermined characteristic of the sensor response represented by each sample is evaluated, the monitoring step being carried out in a processing path having an input to which all samples are supplied in series and providing an output indication of the evaluating result for each sample. Finally, the indication of the evaluating result of each sample is interpreted in order to provide an indication of the status of each process.

19 Claims, 1 Drawing Sheet

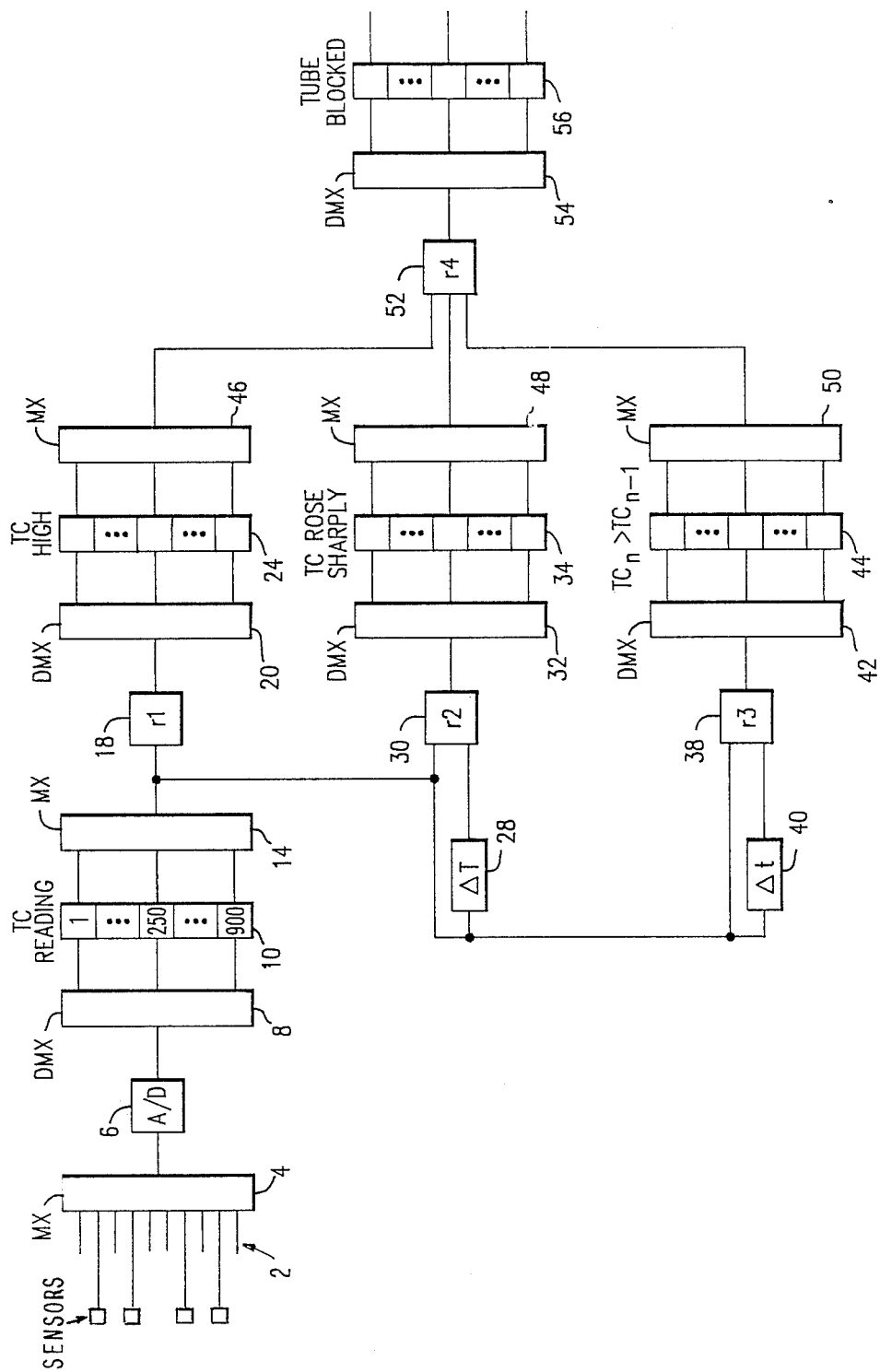

MONITORING A PLURALITY OF IDENTICAL PROCESS PARAMETERS

BACKGROUND OF THE INVENTION

The present invention relates to the monitoring of processes, particularly in installations where a large number of processes which are identical with respect to at least one process parameter are being performed.

In many installations of this type, it is frequently necessary to monitor all of the ongoing processes, and the monitoring results are employed to derive diagnoses of the condition, or status, of each individual process. It may be desired, for example, to monitor at least one operating parameter of each process and to test or compare various measured parameters according to specified rules in order to arrive at diagnoses indicating the operating state of each process, and thus of the component or components controlling the process. These operations may be carried out in a digital computer in which each rule is constituted by a programming subroutine.

Such a procedure is employed in diagnostic expert systems in which selected items of information relating to the processes are compared or combined according to specified rules in order to produce diagnostic information. In certain systems, there are a large number of essentially identical processes which are being performed simultaneously and which all have the same nominal operating parameters or at least one nominal operating parameter in common. For example, a boiler may contain a waterwall composed of a large number of tubes through which water is flowing while being heated. These tubes are nominally identical in that they are all associated with the same flow and heat distribution conditions. The conditions in each tube may be monitored by a temperature sensor, as well as other components, and the output readings of each temperature sensor must be examined as part of an overall monitoring and diagnostic system.

It is known to monitor the readings produced by a variety of condition sensors and to test and combine the monitoring results according to various rules developed on the basis of recommendations provided by individuals possessing expertise in the operation of the apparatus being monitored. Therefore, these monitoring and diagnosis systems are known as expert systems. One exemplary system of this type is disclosed in U.S. Pat. No. 4,644,479, which issued on Feb. 17, 1987 to Kemper et al.

Known expert systems interpret sensor readings and combine the interpreted readings from various sensors to produce diagnoses of the operating conditions of components and subsystems of the apparatus being monitored. These operations are carried out according to various rules which provide indications, inter alia, of the validity of the sensor readings or the level of confidence in the sensor readings, measures of belief and disbelief in the resulting diagnosis, the severity, importance and priority of malfunction diagnosis, etc.

When the apparatus or plant being monitored has a large number of nominally identical components in which nominally identical processes are being performed, a set of instructions must be provided for implementing each rule associated with each sensor output evaluation and each diagnostic step. Each set of instructions is generally provided in the form of a subroutine stored in memory. Since it has heretofore been the practice to provide a separate set of instructions for each rule which is to be applied to the output of each sensor, a considerable amount of programming time must be employed and a considerable amount of memory capacity must be provided when a large number of identical processes are to be monitored.

Heretofore, attempts have been made to reduce the amount of programming time required for implementing a given rule by creating an appropriate subroutine containing the instructions applicable to each sensor, this being called a template, and then duplicating that subroutine for each nominally identical sensor. While this procedure introduces some simplification to the programming effort, it nevertheless requires a considerable memory capacity for storage for all copies of each subroutine.

SUMMARY OF THE INVENTION

It is an object of the present invention to further simplify the programming required for evaluating sensor outputs and combinations of sensor outputs in a diagnostic system which monitors apparatus containing a large number of functionally identical components.

Another object of the invention is to substantially reduce the amount of memory capacity required in such a system.

The above and other objects are achieved according to the present invention by a method and system for monitoring a plurality of processes which are identical with respect to at least one process parameter employing a plurality of sensors each disposed for monitoring the one process parameter of a respective process, the sensors all having identical responses to the one process parameter, in which: a succession of sensor response samples are derived, each successive sample being associated with a respective sensor, and each sample is evaluated in succession for a predetermined characteristic of the sensor response represented by that sample, the evaluation being performed in a processing path having an input to which all samples are applied in series and having an output for providing an indication of the evaluating result for each sample; and the indication of the evaluating result of each sample is interpreted in order to provide an indication of the status of each process.

BRIEF DESCRIPTION OF THE DRAWING

The sole FIGURE is a block diagram of a preferred embodiment of a system according to the present invention.

DESCRIPTION OF THE PREFERRED EMBODIMENTS

The FIGURE illustrates, in the form of a block diagram, a system for implementing the simplified monitoring procedure according to the invention. This system could be of the dedicated, or hard-wired, type or it could be created by suitable programming of a general purpose digital computer, with each register shown in the FIGURE being constituted by a respective group of memory locations. The illustrated system is connected to monitor a large number, for example 900, of boiler waterwall temperature sensors whose outputs 2 are monitored repetitively during successive time frames, each frame being of duration T. Each sensor may, typically, be a temperature monitoring thermocouple.

During each frame T, the signals on all of the outputs 2 are applied in succession via a time multiplexer 4 to an analog/digital converter 6. The signal on each sensor output 2 is supplied to converter 6 during a respective time slot, t, having a duration such that the number of time slots t in each frame T is equal to the number of temperature sensors. If the sensors produce digital outputs, converter 6 can be eliminated.

Each digitized sensor output sample is then conducted from converter 6 via a time demultiplexer 8 to a respective cell, or memory location, of a register 10 which stores the digital representation of the output reading of a respective thermocouple sensor. Thus, at the end of a given frame T, digital representations of the present readings of all of the sensors are present in respective cells of register 10, which constitutes an array node.

Each cell of register 10 has an output line connected to a respective input of a time multiplexer 14 which supplies the digital values stored in the cells of register 10 in succession to a monitoring unit 18 which tests each digital value according to a given rule r1 which provides an indication of whether or not the reading being produced by each sensor is higher than a selected value corresponding to the upper range of the normal operating temperature. The resulting indication produced by unit 18 for the reading of each sensor is supplied via a time demultiplexer 20 to a respective cell, or memory location, of a further register 24, which constitutes a second array node.

Unit 18 performs the same operation on each sensor reading stored in register 10, and thus implements the array rule r1 for testing all of the sensor readings. Thus, unit 18 can be constituted by a single set of instructions, or a single subroutine, which operates repetitively on successive output samples from the respective sensors.

The serial output from multiplexer 14 is additionally supplied to the input of a delay member 28 which produces a time delay, $\Delta T$, equal to the frame interval, T. Delay member 28 could, for example, be a serial register having a number of stages equal to the number of time slots in each time frame.

The output of delay member 28 is supplied, together with the output of multiplexer 14, to a second monitoring unit 30 which, during the period, t, of each time slot compares the values of the digital signals at its inputs according to a rule r2 and produces an indication whenever the value being supplied from multiplexer 14 exceeds that being supplied by delay member 28 by a predetermined amount. Since the two signals supplied at any given instant to unit 30 represent successive readings from the same sensor, unit 30 will produce an output signal indicative of whether the temperature reading of that sensor has risen sharply.

Depending on the conditions to be encountered in the system being monitored, this indication could also be based on a comparison of the readings produced by a given sensor over a time interval composed of a plurality of frame periods. In this case, delay member 28 would be constructed to produce a delay equal to nT, where n is a selected integer.

Monitoring unit 30 can be constructed in a manner similar to unit 18 and thus implements a second array rule.

The successive output indications produced by unit 30 are supplied, via a demultiplexer 32, to respective locations of a register 34, where they are temporarily stored. Register 34 constitutes a third array node.

The output from multiplexer 14 is additionally applied simultaneously to one input of a third monitoring unit 38 and to the input of a second delay member 40 which delays signals arriving thereat by an interval, $\Delta t$, equal to the duration of one time slot, t, and which supplies the delayed signal to a second input of monitoring unit 38. Monitoring unit 38 thus receives, during each time slot, the sensor signal sample associated with that time slot and the sensor signal sample associated with the immediately preceding time slot. The two signal samples supplied to monitoring unit 38 are thus indicative of the temperature readings of two adjacent sensors at essentially the same point in time. Monitoring unit 38 is arranged to compare the temperature readings being produced by two adjacent sensors according to a rule r3 and to produce an output indication when the temperature reading of the sensor associated with a given time slot exceeds that of the sensor associated with the immediately preceding time slot by more than a selected threshold magnitude.

The monitoring result produced by monitoring unit 38 is then supplied, via a demultiplexer 42, to a further register 44 having a plurality of memory locations each associated with a respective time slot, and thus with a respective sensor, register 44 constituting a fourth array node.

For each time slot, the outputs of corresponding memory locations of registers 24, 34 and 44 are supplied via respective multiplexers 46, 48 and 50 to a diagnostic unit 52 which combines the outputs from memory locations associated with the same time slot, and thus the same sensor, according to a rule r4 and derives an output signal constituting an indication of the status of the boiler tube containing the sensor associated with that time slot. Thus, in the specific example illustrated in the FIGURE, when the temperature reading of a given sensor is higher than a selected upper limit, has risen sharply from the measurement produced during a preceding time slot and is higher than the reading of the sensor in the adjacent tube, rule r4 produces the conclusion that the associated tube is blocked and an indication to this effect is conducted via a demultiplexer 54 to a respective location of an output register 56, constituting a fifth array node, from which the fault indication associated with each boiler tube can be supplied to a higher diagnostic level and/or to an output display being monitored by plant personnel. Unit 52 could alternatively be configured to produce a fault signal when any two of the three inputs constitutes a fault indication.

According to a particular feature of the present invention, as already noted above, each of units 18, 30, 38 and 52 is constituted by a single set of instructions, or a subroutine, which is executed repetitively on the output sample from each sensor, each set of instructions defining a selected rule (r1, r2, r3, r4). This means that, for executing each rule, only a single set of program instructions, or commands, need be stored since this same set will be employed for monitoring the output of each sensor. This results in a significant saving of operating memory space compared to known systems in which a respective set of programming instructions is stored in memory for testing the output signals from each sensor.

Of course, the present invention can be applied to any other monitoring or diagnostic system in which the outputs from a substantial number of nominally identical sensors must be processed identically.

In systems according to the invention, any one of the monitoring units could be configured to perform various functions employed in expert diagnostic systems, such as the development of an indication of the degree of confidence in the particular sensor reading, which would cause the output produced by the particular monitoring unit to have a value which can vary over a certain range, and representations of measures of belief and disbelief in the resulting diagnosis, which could, for example, be reflected in the value of the indication signal appearing in each location of register 56. In general, any known diagnostic tool can be incorporated into the programming or circuit structure constituting each monitoring unit.

A diagnostic operation according to the disclosed example of the present invention can be carried out by processing the sensor readings derived during a given time frame in parallel in monitoring units 18, 30, and 38, with the processing in unit 52 being carried out during a subsequent time frame.

The system illustrated in the FIGURE includes a plurality of intermediate storage registers 10, 24, 34 and 44 from which the various individual indications can be supplied to respective output devices. This might be of use if, for example, it is desired to separately monitor the operation of selected sensors or to verify the indications which contributed to a diagnosis.

However, if these functions need not be performed, the invention could be implemented by a system from which all registers except output register 56 and all multiplexers and demultiplexers except for multiplexer 4 and demultiplexer 54 are eliminated. In this case, the output of converter 6 would be connected directly to the inputs of monitoring units 18, 30 and 38 and delay numbers 28 and 40, and the outputs of monitoring units 18, 30 and 38 would be connected directly to respective inputs of monitoring unit 52. This arrangement would represent a substantial structural simplification and would shorten the time between the sampling of a set of sensor readings and the derivation of a diagnostic indication since sensor output signal samples could then be supplied to elements 18, 28, 30, 38 and 40 during a first frame interval, and the output indications from units 18, 30 and 38 would be processed in unit 52 and be supplied to register 56 during the same frame interval or the next succeeding frame interval.

The present invention could alternatively be implemented by creating a memory matrix in which each column is associated with a particular sensor and each row represents a different fact about that sensor. For example, in each column, a first row would store the indication of the current sensor reading, a second row an indication of whether that reading is abnormally high, a third row the indication of the sensor reading during the preceding frame interval, a fourth row an indication of whether the sensor temperature reading rose sharply, a fifth row an indication of whether the sensor reading is higher than that of the adjacent sensor, and a sixth row a resulting indication of a conclusion as to whether the associated tube is blocked. Conceptually, each row would thus correspond to one of the registers illustrated in the FIGURE.

Then, appropriate locations of the matrix would be linked according to the respective rules to derive the desired indications. Specifically, in the column associated with a respective sensor, the first row would be linked to the second row according to rule r1, the first and third rows would be linked to the fourth row according to rule r2, the first row of that column and the first row of an adjacent column would be linked to the fifth row of that column according to rule r3, and the second, fourth and fifth rows would be linked to the sixth row according to rule r4.

With this arrangement, the indications associated with the sensors would be derived successively by providing, for each rule, a single set of instructions to which the indication or indications associated with each sensor are applied in turn. Here again, the provision of a single set of instructions for each rule minimizes the memory space required to store the instructions.

While the invention has been exemplified by an arrangement which evaluates the outputs of a plurality of sensors of one type, the invention could also be employed in further diagnostic levels where the outputs of different types of sensors are compared or correlated to perform other diagnostic functions. In this case, all sensors of a given type would be monitored in the manner described above and the results associated with different sensors associated with the same component or process would be multiplexed and supplied to an evaluation or diagnostic unit in a manner such that each such unit would receive information associated with a given component or process in time coincidence and would supply the resulting evaluation or diagnostic indication to a higher level diagnostic unit in the appropriate time sequence or, by demultiplexing, to a display or storage location associated with the particular component or process.

What is claimed:

1. A system for monitoring a plurality of processes which are identical with respect to at least one process parameter, employing a plurality of sensors each connected for monitoring the at least one process parameter of a respective process, each sensor having a response and the sensors all having identical responses to the at least one process parameter, comprising: sampling means connected to the sensors for deriving a succession of sensor response samples, each successive sample being associated with a respective sensor; monitoring means connected to said sampling means for receiving each sample in succession and for evaluating a predetermined characteristic of the sensor response represented by each sample to produce an evaluating result, said monitoring means defining a processing path having an input to which all samples are applied in series and having an output for providing an indication of the evaluating result for each sample; and diagnosing means connected for receiving and interpreting the indication of the evaluating result of each sample in order to provide an indication of status of each process.

2. The system as defined in claim 1 wherein said sampling means comprises time multiplexer means having a plurality of inputs each connected to a respective sensor, and an output for providing the succession of response samples.

3. The system as defined in claim 2 wherein said monitoring means comprises means for executing a set of instructions repetitively on each response sample in succession.

4. The system as defined in claim 3 wherein said sensors produce analog outputs; said sampling means comprises an analog/digital converter for producing digital samples; and said monitoring and diagnosing means are digital elements.

5. The system as defined in claim 4 wherein said monitoring means is operative to perform a plurality of parallel evaluations of respectively different characteristics of the sensor response associated with each sample and defines a plurality of parallel processing paths each having an input to which all samples are applied in series and an output for providing an indication of a respective evaluating result for each sample, with the evaluating result indications associated with a given sensor appearing simultaneously at the path outputs, and said diagnosing means is connected for receiving the evaluating result indications appearing at all path outputs.

6. The system as defined in claim 3 wherein said monitoring means is operative to perform a plurality of parallel evaluations of respectively different characteristics of the sensor response associated with each sample and defines a plurality of parallel processing paths each having an input to which all samples are applied in series and an output for providing an indication of a respective evaluating result for each sample, with the evaluating result indications associated with a given sensor appearing simultaneously at the path outputs, and said diagnosing means is connected for receiving the evaluating result indications appearing at all path outputs.

7. The system as defined in claim 2 wherein said sensors produce analog outputs; said sampling means comprises an analog/digital converter for producing digital samples; and said monitoring and diagnosing means are digital elements.

8. The system as defined in claim 2 wherein said monitoring means is operative to perform a plurality of parallel evaluations of respectively different characteristics of the sensor response associated with each sample and defines a plurality of parallel processing paths each having an input to which al samples are applied in series and an output for providing an indication of a respective evaluating result for each sample, with the evaluating result indications associated with a given sensor appearing simultaneously at the path outputs, and said diagnosing means is connected for receiving the evaluating result indications appearing at all path outputs.

9. The system as defined in claim 1 wherein said monitoring means comprises for executing a set of instructions repetitively on each response sample in succession.

10. The system as defined in claim 1 wherein said sensors produce analog outputs; said sampling means comprises an analog/digital converter for producing digital samples; and said monitoring and diagnosing means are digital elements.

11. The system as defined in claim 1 wherein said monitoring means is operative to perform a plurality of parallel evaluations of respectively different characteristics of the sensor response associated with each sample and defines a plurality of parallel processing paths each having an input to which all samples are applied in series and an output for providing an indication of a respective evaluating result for each sample, with the evaluating result indications associated with a given sensor appearing simultaneously at the path outputs, and said diagnosing means is connected for receiving the evaluating result indications appearing at all path outputs.

12. A method for monitoring a plurality of processes which are identical with respect to at least one process parameter, employing a plurality of sensors each connected for monitoring the at least one process parameter of a respective process, each sensor having a response and the sensors all having identical responses to the at least one process parameter, comprising: deriving from the sensor responses a succession of response samples each derived from a respective sensor; monitoring each sample in succession and evaluating a predetermined characteristic of the sensor response represented by each sample to produce an output indication, said monitoring step being carried out in a processing path having an input to which all samples are applied in series and providing an output indication of the evaluating result for each sample; and interpreting the indication of the evaluating result of each sample in order to provide an indication of status of each process.

13. The method as defined in claim 12 wherein said step of deriving is carried out with time multiplexer means having a plurality of inputs each connected to a respective sensor, and an output for providing the succession of response sample.

14. The method as defined in claim 13 wherein said step of monitoring comprises executing a set of instructions repetitively on each response sample in succession.

15. The method as defined in claim 14 wherein the sensors produce analog outputs; said step of deriving comprises performing analog/digital conversion of the analog outputs for producing digital samples; and said monitoring and interpreting steps are carried out by processing digital signals.

16. The method as defined in claim 15 wherein said monitoring step performs a plurality of parallel evaluations of respectively different characteristics of the sensor response associated with each sample in a plurality of parallel processing paths each having an input to which al samples are applied in series and an output for providing an indication of a respective evaluating result for each sample, with the evaluating result indications associated with a given sensor appearing simultaneously at the path outputs, and said interpreting step is carried out in response to the evaluating result indications appearing at all path outputs.

17. The method as defined in claim 12 wherein said step of monitoring comprises executing a set of instructions repetitively on each response sample in succession.

18. The method as defined in claim 12 wherein the sensors produce analog outputs; said step of deriving comprises performing analog/digital conversion of the analog outputs for producing digital samples; and said monitoring and interpreting steps are carried out by processing digital signals.

19. The method as defined in claim 12 wherein said monitoring step performs a plurality of parallel evaluations of respectively different characteristics of the sensor response associated with each sample in a plurality of parallel processing paths each having an input to which all samples are applied in series and an output for providing an indication of a respective evaluating result for each sample, with the evaluating result indications associated with a given sensor appearing simultaneously at the path outputs, and said interpreting step is carried out in response to the evaluating result indications appearing at all path outputs.

* * * * *